Jan. 17, 1967   F. T. IRGENS   3,298,315
SERIES CONNECTED PUMPING SYSTEM
Filed Nov. 5, 1964

INVENTOR.
FINN T. IRGENS
BY
Wheeler, Wheeler & Wheeler
ATTORNEYS.

United States Patent Office 3,298,315
Patented Jan. 17, 1967

3,298,315
SERIES CONNECTED PUMPING SYSTEM
Finn T. Irgens, Milwaukee, Wis., assignor to Outboard Marine Corporation, Waukegan, Ill., a corporation of Delaware
Filed Nov. 5, 1964, Ser. No. 409,230
6 Claims. (Cl. 103—5)

The invention relates generally to gear pumps and more particularly to chain saws including oil pumps affording lubrication of the chain saw including the saw chain.

While it is desirable to relatively continuously lubricate a saw chain during cutting operation, only a relatively small amount of oil is sufficient. The present invention provides a chain saw having an oil pumping system which is selectively manually operable and engine powered and which, when engine powered, continously periodically meters small quantities of oil to the chain.

More specifically, the invention provides a gear pump including a housing having an inlet and an outlet and intermeshing gear means located in and cooperating with the housing to afford, in response to rotation of said gear means, periodic fluid pumping operation from the housing inlet to the housing outlet and relatively free fluid passage between the inlet and outlet between pumping operations.

In the specifically disclosed construction, the gear means comprises three gears which have differing numbers of teeth. Two of the gears are coaxially mounted in meshing engagement with the other gear. Each of the gears includes a raised tooth sector which is thicker than a remaining or recessed tooth sector. The raised tooth sectors afford pumping operation only when all of the raised sectors are simultaneously enmeshed and in general registry. Thus, because of the variance in the number of teeth on the gears, pumping operation takes place only once during a relatively large number of revolutions of any one of the gears.

In addition, the recessed sectors afford free oil passage through the housing whenever the raised sections are not simultaneously enmeshed and in general registration, thereby affording oil discharge through the outlet, as desired, by operation of a manual pump upstream from the gear pump.

Other objects and advantages of the invention will become known by reference to the following description and the accompanying drawings in which FIGURE 1 is a schematic view of a chain saw embodying an oil pumping system in accordance with the invention;

Figure 1:
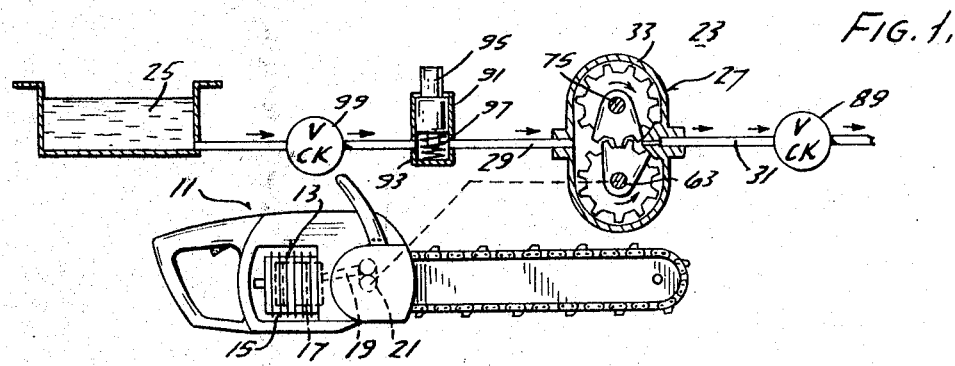
Figure 3:
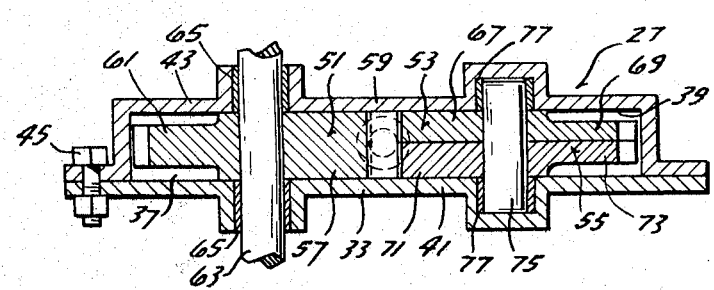
FIGURE 3 is a sectional view taken along line 3—3 of FIGURE 2.
Figures 2, 4:
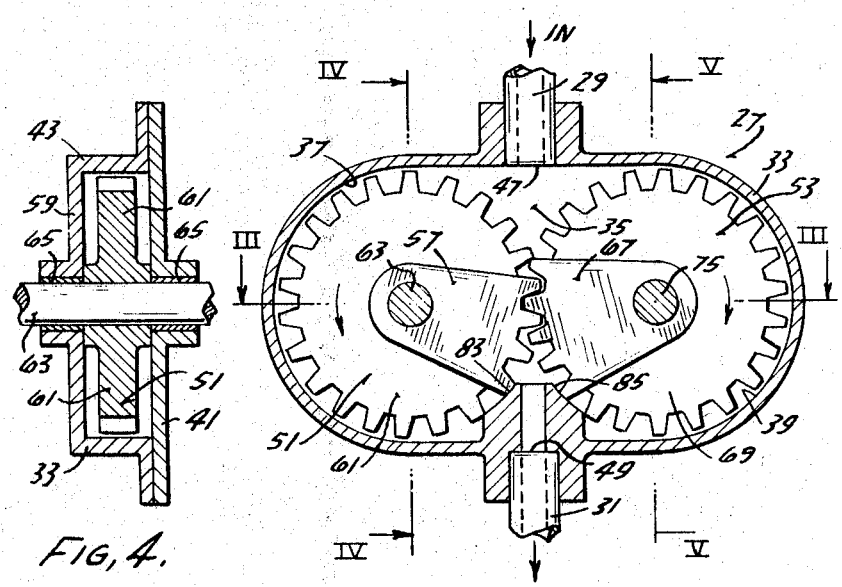
FIGURE 2 is an enlarged view, partially broken away and in section, of a portion of the system shown in FIGURE 1.
FIGURE 4 is a sectional view taken along line 4—4 of FIGURE 2.
Figure 5:
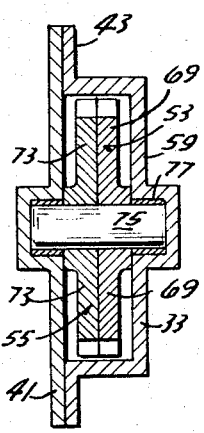
FIGURE 5 is a sectional view taken along line 5—5 of FIGURE 2.

The drawings are illustrative of the chain saw 11 including a prime mover such as an internal combustion engine 13 having a cylinder 15, a piston 17 reciprocably operable in the cylinder 13, a connecting rod 19, and an output or crankshaft 21.

Included in the chain saw 11 as also shown digrammatically in FIGURE 1, is an oil supply system 23 including a reservoir 25, a rotary gear pump 27, a supply conduit 29 connecting the gear pump 27 and the reservoir 25, and a discharge conduit 31 leading from the gear pump to the saw chain or other component which is to be lubricated.

The rotary gear pump 27 is driven by the engine 13 so as to continuously periodically deliver oil to the discharge conduit 31 and to afford, at times other than during pumping operation, free oil flow through the oil pump. Because of the high speeds at which present saw chain engines operate, the desired oil pump is designed to pump only once during every several hundred rotations of the engine crankshaft.

More specifically, the pump 27 comprises a housing 33 including a pumping chamber 35 having two cylindrically shaped lobes 37 and 39 which are formed through cooperation of a base 41 and a cup-shaped member 43 fixed to the base 41 by bolts 45. As shown in the drawings, each of the lobes 37 and 39 is of the same depth. Also included in the housing 33 at the opposing lines of intersection between the lobes 37 and 39 are opposing inlet and outlet openings 47 and 49 which respectively communicate with the supply conduit 29 and the discharge conduit 31.

Contained in the housing 33 are first, second, and third gears 51, 53, and 55, respectively. The first gear 51 is located in the lobe 37 and has a cirmumferential periphery generally corresponding in diameter to the cylindrical periphery of the lobe 37. The gear 51 includes a raised tooth segment 57 having a total thickness corresponding generally to the depth of the lobe 37, i.e., corresponding to the distance between the web 59 of the cup-shaped member 43 and the base 41. The gear also includes a relieved tooth sector 61 which has a lesser thickness than that of the raised tooth sectors 57. Means in the form of a shaft 63 to which the gear 51 is fixed and suitable bearings 65 supported by the housing 33 are provided for rotatably mounting the gear 51 in the lobe 37.

The second gear 53 is located in the lobe 39 and has a circular periphery corresponding in diameter to the cylindrical periphery of the lobe 39. The second gear 53 includes a raised tooth sector 67 and a relieved tooth sector 69 having a lesser width than that of the raised tooth sector 67.

The third gear 55 is also located in the lobe 39 and also has a circular periphery generally corresponding in diameter to the cylindrical periphery of the lobe 39. The third gear 53 includes a raised tooth sector 71 and a relieved tooth sector 73 which is of lesser width than that of the raised tooth sector 71. The gears 53 and 55 are coaxially mounted in meshed engagement with the gear 51 and for independent rotation in the lobe 39 by means which, in the disclosed construction, takes the form of a shaft 75 carried by suitable bearings 77 supported in the housing 33.

The period between pumping operations is determined by the number of teeth on the gears 51, 53, and 55. In the specifically disclosed construction, the first gear 51 has twenty teeth, the second gear 53 has twenty-one teeth, and the third gear 55 has twenty-two teeth. As the second and third gears differ in the number of teeth by only one, there is little difficulty in providing a special tooth form which affords a common outer diameter and common engagement with the first gear 51.

Oil pumping operation occurs when the raised sectors 57, 67, and 71 are in registry with one another and with the surfaces 83 and 85 adjacent the outlet 49. In the disclosed construction, the angular extent of the sectors is such as to enable engagement of the sectors 57, 67, and 71 with the lobe surfaces 83 and 85 adjacent the outlet 49 when the raised sectors 57, 67, and 71 are also in meshed engagement with one another. As the enmeshed teeth travel toward the outlet 49, the oil between opposed teeth is trapped and is delivered from the inlet to the outlet. Under all other circumstances, the relieved gear portions 61, 69, and 73 afford passage of oil from between the enmeshed teeth and direct communication between the inlet 47 and the outlet 49.

The quantity of oil delivered during each pumping operation can be varied in accordance with the angular extent of the raised portions 57, 67, and 71. In the disclosed construction, the angular extent of the raised sectors is limited to afford pumping operation only once during each full cycle of gear rotation and to afford a minor amount of pumping during said one pumping operation. If the angular extent of the sectors is sufficiently increased, the gears can be in sufficient registration to effect pumping more than once for every complete cycle and pumping will be effected by several enmeshed teeth when the sectors are in maximum registration.

Various arrangements can be employed to drive the gear pump 27. In the disclosed construction, the shaft 63 is an extension of the crankshaft 21.

In order to prevent backflow from the discharge conduit 31 to the gear pump housing 33, a check valve 89 is provided. The valve can be located either in the conduit 29 as shown or can be physically incorporated as a part of the gear pump 27.

The disclosed system also includes means affording manual delivery of oil through the discharge conduit 31 in order to provide additional lubrication as desired. Such means includes the before mentioned relieved tooth sectors 61, 69, and 73, together with a manual pump 91 in the supply conduit 29 between the reservoir 25 and the inlet 47. While various arrangements can be employed, the manual pump 91 includes a cylinder 93, a piston 95, and spring means 97 biasing the piston outwardly of the cylinder, thereby affording free fluid flow through the manual pump from the reservoir 25 to the pump 27. In order to prevent backflow through the supply conduit 29 to the reservoir 25 during manual pumping operation, a check valve 99 is included in the conduit 29. In operation, the piston 95 is manually displaced inwardly of the cylinder 93 and against the action of the spring 97 to deliver oil through the supply conduit 29, the housing 33, and the discharge conduit 31.

In overall operation, whenever the shaft 63 is rotated, the gears 51, 53, and 55 are rotated relative to each other. When the raised tooth sectors 57, 67, and 71 become aligned with each other, oil pumping takes place from the inlet 47 to the outlet 49. At all other times, oil pumping does not occur because the inlet and outlet are in direct communication with each other due to the presence of the relieved tooth sectors 61, 69, and 73. The system can be manually operated to deliver oil through the discharge conduit 31 whenever the raised sectors 57, 67, and 71 are not in registration with each other. Due to the speed of rotation of the gears and the infrequency of registration of the raised tooth sectors, for practical purposes, the manual pump can be operated whenever desired.

Various of the features of the invention are set forth in the following claims.

What is claimed is:

1. A rotary gear pump comprising a pump housing having inlet and outlet openings, a first gear, means mounting said first gear for rotation in said housing, a second gear, a third gear, means mounting said second and third gears in said housing for rotation in meshing engagement with said first gear, and means on said first, second, and third gears and on said housing affording periodic fluid pumping operation from said inlet to said outlet in response to gear rotation, and relatively free fluid passage between said inlet and said outlet between pumping operations.

2. A rotary gear pump comprising a pump housing having inlet and outlet openings, a first gear, means mounting said first gear for rotation in said housing, a second gear, a third gear, means coaxially mounting said second and third gears in said housing for rotation in meshing engagement with said first gear, and means on said first, second, and third gears and on said housing affording periodic fluid pumping operation from said inlet to said outlet in response to gear rotation, and relatively free fluid passage between said inlet and said outlet between pumping operations.

3. A fluid pumping system comprising a rotary gear pump including a housing having inlet and outlet openings, a first gear, means mounting said first gear for rotation in said housing, a second gear, a third gear, means coaxially mounting said second and third gears in said housing for rotation in meshing engagement with said first gear, and means on said first, second, and third gears and on said housing affording periodic fluid pumping operation from said inlet to said outlet in response to rotation of said gear means, and relatively free fluid passage between said inlet and said outlet between pumping operations, a reservoir, an oil conduit communicating between said reservoir and said inlet, a manual pump in said oil conduit, a first check valve in said oil conduit between said manual pump and said reservoir to prevent return oil flow to said reservoir, and a second check valve in communication with said outlet to prevent return oil flow through said housing.

4. A rotary gear pump comprising a pump housing having opposed inlet and outlet openings, a first gear having a first tooth sector with a thickness corresponding to the depth of said housing, and a remaining tooth sector of lesser thickness than said first sector, means mounting said driving gear for rotation in said one lobe, a second gear having a number of teeth different from that of said first gear, having a first tooth sector, and a remaining tooth sector of lesser thickness than said first sector, a third gear having a number of teeth different from the number of teeth of either of said first and second gears, a first tooth sector, and a remaining tooth sector of lesser thickness than said first sector, said first tooth sectors of said second and third gears having a combined thickness generally corresponding to the depth of said housing, and means coaxially mounting said second and third gears in said housing for rotation in meshing engagement with said first gear.

5. A rotary gear pump comprising a pump housing having a pair of intersecting cylindrical lobes and opposed inlet and outlet openings respectively located at the intersections of said lobes, a driving gear having a first tooth sector with a thickness corresponding to the depth of one of said lobes, a remaining tooth sector of lesser thickness than said first sector, and a circumferential periphery corresponding generally to the cylindrical periphery of said one lobe, means mounting said driving gear for rotation in said one lobe, a second gear having a number of teeth different from that of said first gear, having a first tooth sector, a remaining tooth sector of lesser thickness than said first sector, and a circumferential periphery corresponding generally with the cylindrical periphery of the other of said lobes, a third gear having a number of teeth different from the number of teeth of either of said first and second gears, a first tooth sector, a remaining tooth sector of lesser thickness than said first sector, and a circumferential periphery corresponding generally to the cylindrical periphery of said other lobe, said first tooth sectors of said second and third gears having a combined thickness generally corresponding to the depth of said other lobe, and means coaxially mounting said second and third gears in said other lobe for rotation in meshing engagement with said first gear.

6. A chain saw having an engine, a rotary gear pump comprising a pump housing having a pair of intersecting cylindrical lobes and opposed inlet and outlet openings respectively located at the intersections of said lobes, a first gear driven by said engine and having a first tooth sector with a thickness corresponding to the depth of one of said lobes, a remaining tooth sector of lesser thickness than said first sector, and a circumferential periphery corresponding generally to the cylindrical periphery of said one lobe, means mounting said driving gear for rotation in said one lobe, a second gear having a number of teeth different from that of said first gear, having a first tooth sector, a remaining tooth sector of lesser thickness than said first sector, and a circumferential periphery corresponding generally with the cylindrical periphery of the other of said lobes, a third gear having a number of teeth different from the number of teeth of either of said first and second gears, a first tooth sector, a remaining tooth sector of lesser thickness than said first sector, and a circumferential periphery corresponding generally to the cylindrical periphery of said other lobe, said first tooth sectors of said second and third gears having a combined thickness generally corresponding to the depth of said other lobe, and means coaxially mounting said second and third gears in said other lobe for rotation in meshing engagement with said first gear, a reservoir an oil conduit communicating between said reservoir and said inlet, a manual pump in said oil conduit, a first check valve in said oil conduit between said manual pump and said reservoir to prevent return oil flow to said reservoir, and a second check valve in communication with said outlet to prevent return oil flow through said housing.

References Cited by the Examiner

UNITED STATES PATENTS

| | | | |
|---|---|---|---|
| 601,126 | 3/1895 | Cook | 230—218 |
| 695,232 | 3/1902 | Reynolds | 103—5 |
| 1,998,734 | 4/1935 | Parker | 230—218 |
| 2,157,089 | 5/1939 | Storch et al. | 103—5 |
| 2,330,558 | 9/1943 | Curtis | 103—5 |
| 2,697,911 | 12/1954 | Joy | 103—126 |
| 2,856,863 | 10/1958 | Folley | 103—153 |
| 3,147,712 | 9/1964 | Gaubatz | 103—5 |

FOREIGN PATENTS

| | | |
|---|---|---|
| 751,055 | 6/1956 | Great Britain. |

MARK NEWMAN, *Primary Examiner.*

W. J. KRAUSS, *Assistant Examiner.*